(No Model.)

T. W. BROOKS.
AIR VALVE.

No. 542,516. Patented July 9, 1895.

Witnesses:
E. A. Brandau
Nilson D. Bent Jr.

Inventor:
Thos. W. Brooks
By John Richards
Atty

UNITED STATES PATENT OFFICE.

THOMAS W. BROOKS, OF SAN FRANCISCO, CALIFORNIA, ASSIGNOR TO THE DUNHAM, CARRIGAN & HAYDEN COMPANY, OF SAME PLACE.

AIR-VALVE.

SPECIFICATION forming part of Letters Patent No. 542,516, dated July 9, 1895.

Application filed June 29, 1894. Serial No. 516,089. (No model.)

*To all whom it may concern:*

Be it known that I, THOMAS W. BROOKS, a citizen of the United States, residing in the city and county of San Francisco, State of California, have invented certain new and useful Improvements in Air or Relief Valves for Water-Pipes; and I hereby declare the following specification and the drawings therewith to be a complete description of my invention and manner of applying the same.

My invention relates to valves for permitting the escape of air from pipes when they are being filled with water and to permit them to fill with air in case the water is drawn off or escapes therefrom.

My improvements consist of a detached spherical valve, made of wood or other like material, the specific gravity of which is less than water, covered with gutta-percha, so as to attain the required buoyancy and stability, a cage or chamber having a valve-seat at the top and a protecting-screen therefor; also in placing a buoyant or loose valve in the axis of the outflow current of the air or water, so the latter will impinge centrally on the valve and raise it in a straight line to the seat.

My invention further includes the combination and employment of an elastic, loose, or buoyant valve and one of metal, so that the gravity of the latter will cause more tardy action in the case of high pressure and velocity of the escaping water, the two valves being capable of acting together or each separately; also other constructive features to be hereinafter pointed out and explained.

Figure 1:
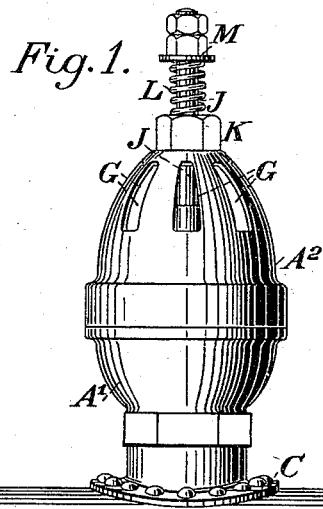
Figure 2:
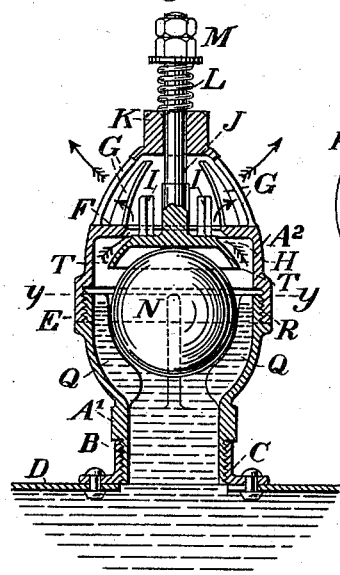
Figure 3:
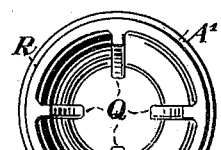
Figure 4:
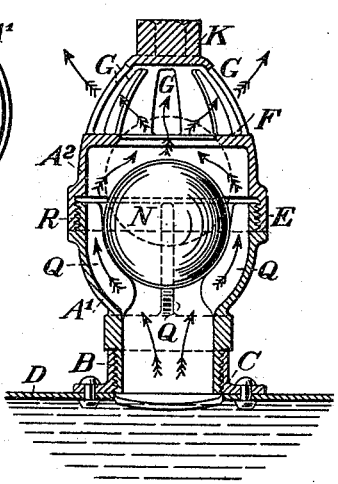
Figure 5:
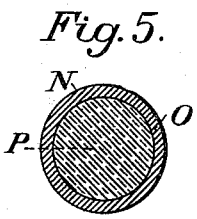

Referring to the drawings, Figure 1 is an elevation of one of my improved air-valves as it appears when attached on a pipe. Fig. 2 is a vertical section of the same valve provided with both a buoyant and a metallic valve. Fig. 3 is a section on the line $y\,y$ of Fig. 2 with the valves removed. Fig. 4 is another vertical section of Fig. 1, the metal valve being omitted. Fig. 5 is a central section through the spherical or buoyant valve.

Similar letters of reference are employed to designate like parts in the different figures of the drawings.

The main part or base A' of the main chamber or cage is provided with a screw-nipple B, that can be inserted in a flange C, attached to the pipe D, or can be screwed directly into the pipe when the latter is thick enough for that purpose. The upper or removable part $A^2$ of the valve-chamber is screwed to a nipple R, formed on the lower part A', as shown at E in the drawings. In the part $A^2$ is formed a valve-seat F, providing an aperture for air or water that escapes from there through the perforations G.

H is a metallic valve having wings I in the usual manner to guide the valve in its seat and a stem J, that projects through the nipple K in the top of the valve-chamber $A^2$ to receive a coil-spring L and the adjustable retaining-nuts M.

N is a spherical valve having a core P, preferably of wood covered with a stratum of gutta-percha O, as seen in the section, Fig. 5. This valve N is so made as to fit the seat F the same as the metal one H, and will operate alone, as will be explained farther on. This valve N when not closed descends and rests on ledges Q, that keep it central and leave a free annular space around the valve, as seen in Figs. 2 and 4.

The operation of my improved air-valves is as follows: Supposing the intended water-pressure to be light, or when the air-valve is applied at a high point in a pipe-line the device is arranged as in Fig. 4, the metallic valve H being omitted. The spherical valve N then rests by gravity on the ledges Q, and when the pipe is being filled with water the contained air is expelled around the valve N, as indicated by arrows in Fig. 4, until the pipe is filled and water takes the place of the air. Then the valve N, by impingement of the water beneath and by its buoyancy, rises and rests on the seat F, forming a sealed joint so long as the pipes are filled and under pressure. If, by accident, the pipes are broken, or by a sudden draft of water therefrom a vacuum is formed in the higher parts of the pipes, then the valve N sinks and permits an inrush of air to supply the place of the water and prevents collapse of the pipes, which might otherwise take place. When the pipe again fills, the air escapes in the manner before explained, so that the action of the air or relief-valve is automatic and certain for flow either way. For the lower pressures and when the impingement of the escaping current of water is not enough to raise a valve of metal, or even a solid one of gutta-percha, the required buoyancy is attained by a core P, of wood or other suitable material, as seen in Fig. 5. This not only permits control of the buoyancy of the valve, but also gives it stability and endurance for shape and wear not attainable with hollow spheres or those made solid of gutta-percha. In the case of higher pressures and when a more tardy action of the valves is desirable and when the impinging force of the escaping water is greater I employ, without change of the other parts, the spherical valve N and a flat metallic one H, having guide-wings in the usual manner, and formed with a downward-projecting lip or flange T, that causes a reactive force of the impinging escape-water, increasing the upward thrust, and thus insures the closing action. In this arrangement the valve N first rises, and when in contact with valve H is held there by the escaping current of water, the current being drawn or directed inward by the spherical form of the valve N, so as to impinge beneath and within the lip or flange T, and thus increase the intensity of the current tending to close the valve H. For very high pressure I employ the metallic valve H alone, the force of escaping flow being sufficient to overcome the gravity and other resistance of the valve.

The grating or perforations G are provided to protect the valves from débris that may be blown into them by the wind; also to prevent them from being tampered with when in exposed places on a pipe-line. In this manner I can, under these arrangements of my improved air-valve, adapt it to the various heads and requirements of use.

The spring L is provided so that when the valve H is drawn inward or open by a vacuum suddenly created in the pipe there will be no shock or noise in such action; also answers the purpose of controlling the resistance offered by the valve H to its closing movement, so it will be seen by these arrangements and adjustments that the device, as a whole, can be adapted to all the varying conditions of use.

Having thus explained the nature and objects of my invention, what I claim as new, and desire to secure by Letters Patent, is—

1. In an air or relief valve, the combination of the casing, a buoyant spherical body adapted to be used as a valve, and a flat disk valve, both within the casing and both acting automatically, and so arranged that both or either can be used in one chamber as the pressure may demand, substantially as described.

2. In an air or relief valve, the combination of the sectional case, whose upper section is perforated and provided with an inner valve seat, a flat disk valve operating in connection with said seat, a buoyant spherical body adapted to be used as a valve, situated below the disk valve, and ledges on the lower portion of the casing for supporting the spherical body, substantially as described.

3. In an air or relief valve, the combination of a chamber or casing having a valve-seat, a buoyant spherical body adapted to be used as a valve, and a removable flat valve, the latter valve being for use under high pressure; the two in conjunction for medium pressures, and the spherical valve alone under low pressure, the other elements remaining the same in each case, in the manner substantially and for the purposes specified.

4. In an air or relief valve, a flat disk valve having guiding wings, and a stem above and a cup-formed downward extension, so the latter will cause reaction of the water and increase the closing force of an impinging current passing around the valve, in the manner substantially and for the purposes described.

5. In an air or relief valve, the combination of the casing, the flat disk valve having a stem, guide wings, and a cup-flange, and the elastic-covered buoyant spherical body adapted to be used as a valve, together with the supporting ledges therefor, substantially as described.

6. The combination of the casing whose upper section is perforated and provided with an inner valve seat, and whose lower section has inner ledges, the flat disk valve having an upper stem and a downward cup-shaped extension, and the buoyant spherical body adapted to be used as a valve and located below the disk valve, said valves being adapted for automatic use either jointly or separately, substantially as described.

7. In an air or relief valve, the combination of a separable chamber having upper and lower sections, the lower section provided with wings or ledges, a buoyant spherical body adapted to be used as a valve sustained centrally by said ledges, and the top section of the casing having an inner valve seat adapted to be closed by the spherical body, an interposed disk valve between the spherical body and the seat, and a spring-provided valve stem for said disk valve, substantially as described.

8. In an air or relief valve, the combination of a buoyant spherical body adapted to be used as a valve, and a flat metallic one in one chamber, and acting together and automatically, the flat valve having a cup-shaped inverted flange to cause a reactive and reverse flow of the upward impinging water, and provided with a stem and an adjustable spring so that the resistance of the valve can be adjusted to suit the amount of water pressure or flow to perform the closing action, substantially as described.

In testimony whereof I have hereunto affixed my signature in the presence of two witnesses.

THOS. W. BROOKS.

Witnesses:
ALFRED A. ENQUIST,
WILSON D. BENT, Jr.